United States Patent [19]

Kubach et al.

[11] 4,293,812
[45] Oct. 6, 1981

[54] CONTROLLED D-C CURRENT SUPPLY SYSTEM, WITH CONTROLLED CURRENT FLOW THROUGH A CHOKE

[75] Inventors: Hans Kubach, Korntal-Münchingen; Hartmann Rupp, Kornwestheim, both of Fed. Rep. of Germany

[73] Assignee: Robert Bosch GmbH, Stuttgart, Fed. Rep. of Germany

[21] Appl. No.: 79,159

[22] Filed: Sep. 26, 1979

[30] Foreign Application Priority Data

Sep. 23, 1978 [DE] Fed. Rep. of Germany ....... 2841569

[51] Int. Cl.³ .................. H03K 3/01; H03K 17/84
[52] U.S. Cl. .................... 323/272; 307/234; 307/270; 307/298; 323/286
[58] Field of Search .......... 307/270, 234, 297; 363/19, 25, 75; 373/272, 286

[56] References Cited

U.S. PATENT DOCUMENTS 3,885,170  5/1975  Kuzyk ........................... 307/270
3,978,393  8/1976  Wisher et al. ................. 363/19
4,034,280  7/1977  Cronin et al. ................. 363/25
4,146,832  3/1979  McConnell ..................... 363/19

Primary Examiner—Stanley D. Miller, Jr.
Assistant Examiner—B. P. Davis
Attorney, Agent, or Firm—Frishauf, Holtz, Goodman & Woodward

[57] ABSTRACT

To equalize current flow through a pair of chokes supplying a d-c load from a d-c source, and, if desired, to limit current flow through either a single choke or both to a predetermined maximum value, without using measuring shunts, the voltage drop through the choke itself is being measured by summing circuits, which may form the algebraic sum or difference, respectively, of the voltages across the chokes, the sum or difference signals then being passed through low-pass filters to form signals representative of inductive voltage difference of two chokes, or of the voltage drop through one or both of them, which signals are then applied to respective regulators which, in turn, control the duty cycle of one or two semiconductor switches, respectively connected in series with the respective chokes.

10 Claims, 6 Drawing Figures

CONTROLLED D-C CURRENT SUPPLY SYSTEM, WITH CONTROLLED CURRENT FLOW THROUGH A CHOKE

The present invention relates to a d-c current supply system to supply a d-c load, in which the d-c current is cyclically interrupted and a choke is serially connected between the interrupting switch and the load; and more particularly to such a circuit in which a controlled semiconductor, with controllable turn-ON, turn-OFF ratio, provides current through the choke, which has a free-wheeling diode connected in parallel thereto, and wherein the current through the choke is measured to provide a control parameter.

BACKGROUND AND PRIOR ART

Current supplies in which a d-c source is serially connected to a load through a choke and a controlled switch are known; the choke has a free-wheeling diode conected in advance thereof—with respect to the load——and a capacitor is located between the choke and the load. A pulse control source controls the ON and OFF cycling of the serially connected controlled switch to control current flow through the load. To determine the actual current flow through the choke, for example in order to limit the current-time integral to a predetermined maximum level, it was previously necessary to provide a measuring shunting circuit across the choke. Such circuits require not only the shunt, but additional circuit components which are comparatively costly and complex.

THE INVENTION

It is an object to provide a control circuit for the d-c current supply circuit above referred to without use of measuring shunt, and more particularly to provide a control circuit which furnishes a control signal when a predetermined maximum value of current flow through the choke is sensed.

Briefly, the d-c voltage drop or ohmic voltage drop across the choke is measured, for example by connecting the input to the choke as well as the output therefrom to a summing circuit and passing the summed voltage through a low-pass filter to eliminate a-c components. The output from the low-pass filter is applied to a controller which, in turn, controls the duty cycle or ON-OFF ratio of the control circuit for the controlled switch. The controller may, for example, be a comparator comparing the output from the low-pass filter with a reference which is representative of a maximum current flow through the choke, in order to then control the controlled switch to turn OFF.

Circuits of this type have current flowing through the choke always in the same direction. Consequently, the time-integral of voltage in an ideal inductivity is zero, so that the controller will have a signal applied thereto which is actually representative of the IR drop due to the resistance of the choke.

DRAWINGS

Figure 1:
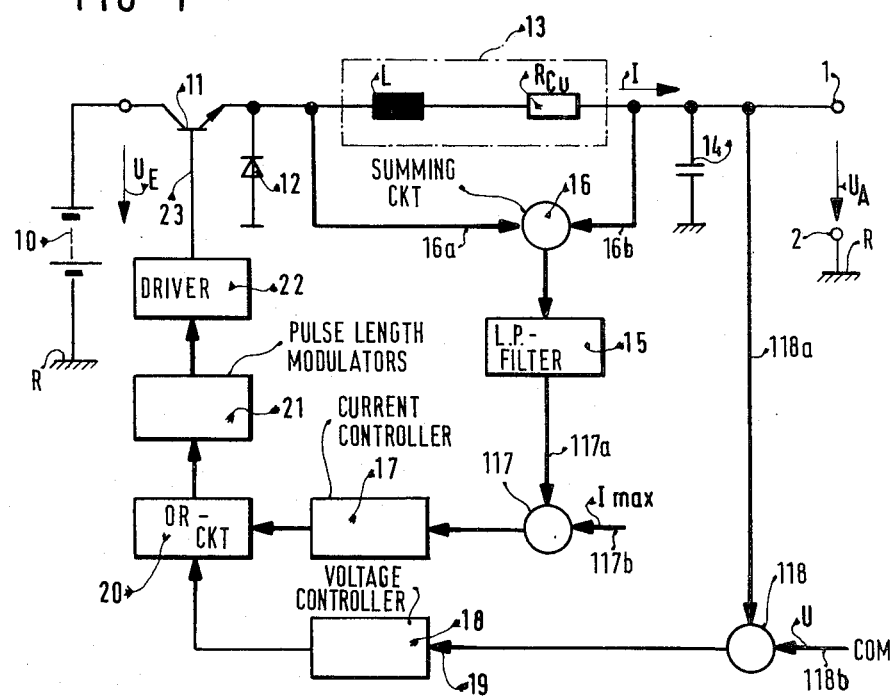
FIG. 1 is a schematic circuit diagram of a first embodiment of the invention and which will also be used in explanation of the operation.

The current supply of FIG. 1 is connected to a d-c source, for example a storage battery 10. Serially connected with the output of the storage battery is a power switching npn transistor 11, which is then connected to a choke 13. The diagram of FIG. 1 shows the equivalent circuit of a choke containing the inductance L and the resistance $R_{CU}$, that is the ohmic or copper resistance of the windings of the choke. A free-wheeling diode 12 is connected to the input of the choke 13; a capacitor 14 is connected to the output of the choke. The output voltage is shown as $U_A$. The negative terminal of the battery is connected to a ground chassis or reference bus R. A load can be connected across the output terminal 1, 2.

Periodic or cyclical control of the transistor 11 to conduction and to blocking provides a predetermined value of current I flowing through the choke, in such a manner that the output voltage $U_A$ is maintained approximately equal to a command value $U_{com}$. The current should not, however, exceed a predetermined maximum value $I_{max}$.

Figure 2:
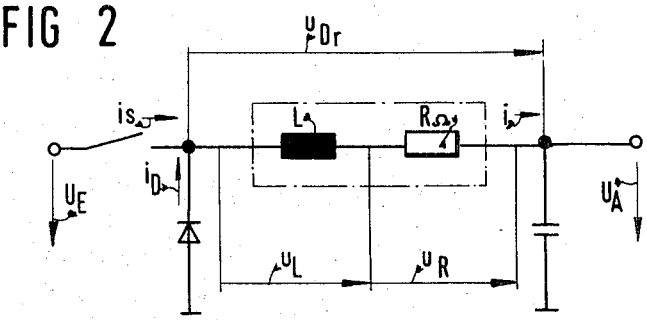
FIG. 2 is a fragmentary equivalent circuit diagram of the choke as connected in the circuit of FIG. 1.

The instantaneous value of the current I can be sensed, without using a measuring shunt, by determining the ohmic voltage drop $U_R$ across the choke (FIG. 2) and to utilize this voltage drop to control the current flow or limit the current flow by commanding switch 11 to turn OFF if the maximum current is being reached or exceeded. The current I flowing through the choke 13 always is in the same direction, as seen in FIG. 4. The rising portion of the current $i_S$ occurs when the supply 10 is connected through the conductive switch 11 to the choke; the dropping portion $i_D$ is the current which flows due to the presence of the free-wheeling diode 12, when the electromagnetic energy stored in the choke 13 is being supplied to the load. The integral of the voltage of an ideal inductivity is zero—see FIG. 3—in which the rising and falling portions of the current through the choke are indicated, and the shaded areas illustrate the time integral of voltage. A low-pass filter 15 which is connected to a summing circuit 16 which sums the voltages at the input and output of the choke 13 eliminates the a-c voltage components and thus the remaining ohmic voltage drop can be measured. The summing circuit 16 thus sums the voltages at terminals 16a, 16b arising at the input and output of the choke and, after being filtered in the low-pass filter, the summed filtered voltages are applied to terminal 117a of a comparator 117. The comparator 117 has a reference value representative of maximum current $I_{max}$ applied at terminal 117b, and the error signal is then applied to a current controller 17. The desired or commanded output voltage $U_{com}$ is applied at terminal 118b to a comparator 118, which has the actual output voltage applied at terminal 118a, and the error signal is applied to a voltage controller 18 at terminal 19. The outputs from the current controller 17 and from the voltage controller 18 are connected to a selection circuit 20 which, in its simplest form, is an OR-circuit, and which provides the extreme one of the two outputs from the controller 17, 18, respectively, to a pulse length modulator 21. Pulse length modulator 21 controls the duty cycle of sequentially recurring control pulses which are applied to a driver stage 22 to, in turn, control the ON and OFF timing of the control electrode connection 23 of the controlled switch, that is, switching transistor 11, in order to change the conduction condition of the transistor 11 between conductive and blocked state.

Figure 3:
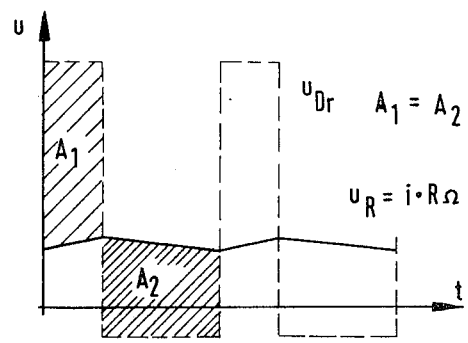
FIG. 3 is a graph illustrating voltage drop across the choke when operating in the circuit of FIGS. 1 and 2.
Figure 4:
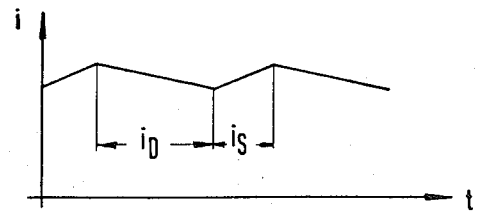
FIG. 4 is a diagram of current flow through the choke.

The voltage $U_{Dr}$, due to the inductance of the choke 13, is shown in FIG. 3. During conduction of the transistor 11, current i rises, and the voltage-time integral is shown at $A_1$. When the transistor blocks, and current flows through the free-wheeling diode 12, the resulting voltage-time integral will be that shown by area $A_2$.

Figure 5:
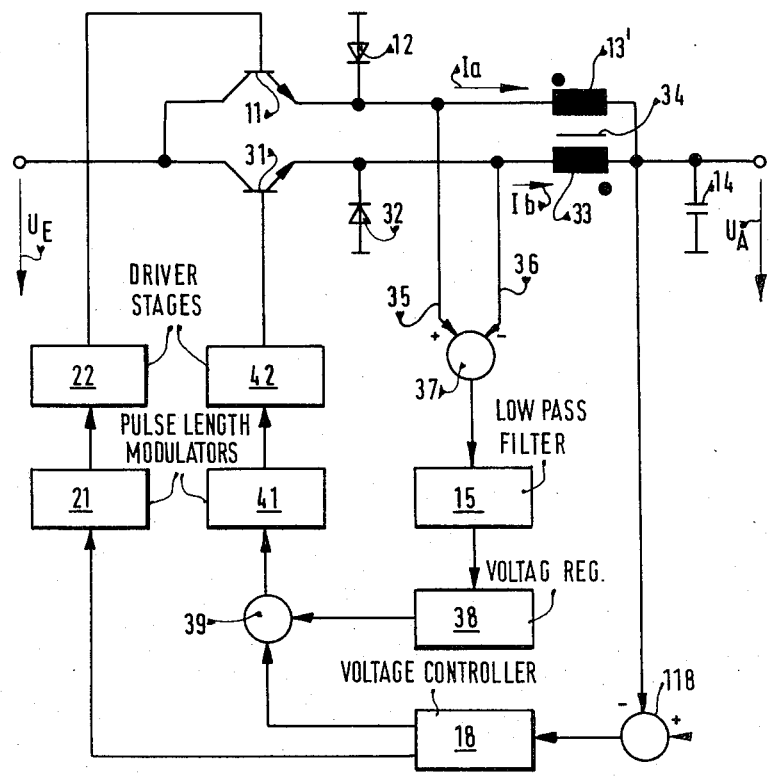
FIG. 5 is a circuit diagram of a two-pulse current supply.

Embodiment of FIG. 5: A two-pulse control circuit having two choke coils is shown, in which elements explained in connection with FIG. 1 have been given the same reference numerals. Choke 13' has a common iron core 34 with choke 33. The elements 11, 18, 21, 22, as well as capacitor 14, correspond to those of FIG. 1. The second choke coil 33 is part of a second current path or branch which is constructed similarly to that of the first branch including transistor 11, free-wheeling diode 12, and choke 13. The second branch has a switching transistor 31, and a free-wheeling diode 32. The first choke coil 13' has current $I_a$ flowing therethrough, the second choke coil 33 has the current $I_b$ flowing therethrough. The voltages arising at the inputs to the two choke coils are applied over lines 35, 36 to a summing circuit 37, which applies the difference of the two voltages in form of an error signal, with proper polarity, to a low-pass filter 15 of the type explained in connection with FIG. 1. The difference of the voltage on the two windings of the chokes is applied to a voltage regulator 38 which is connected to a summing circuit 39, the other input of which is derived from voltage controller 18 (FIG. 1). The summing circuit 39 controls a second pulse length modulator 41 which in turn controls the driver stage 42 and hence the second transistor 31, providing the branching current $I_b$. Due to the difference voltage regulator 38, the voltage time area integrals in the two choke coils are controlled to be the same, that is, the second branch current $I_b$ is so adjusted that it is equal to the branch current $I_a$ in the first branch including the transistor 11.

The summing circuits 37, 39, of course, sum the applied signals algebraically, that is, can function as subtracting or difference circuits.

Figure 6:
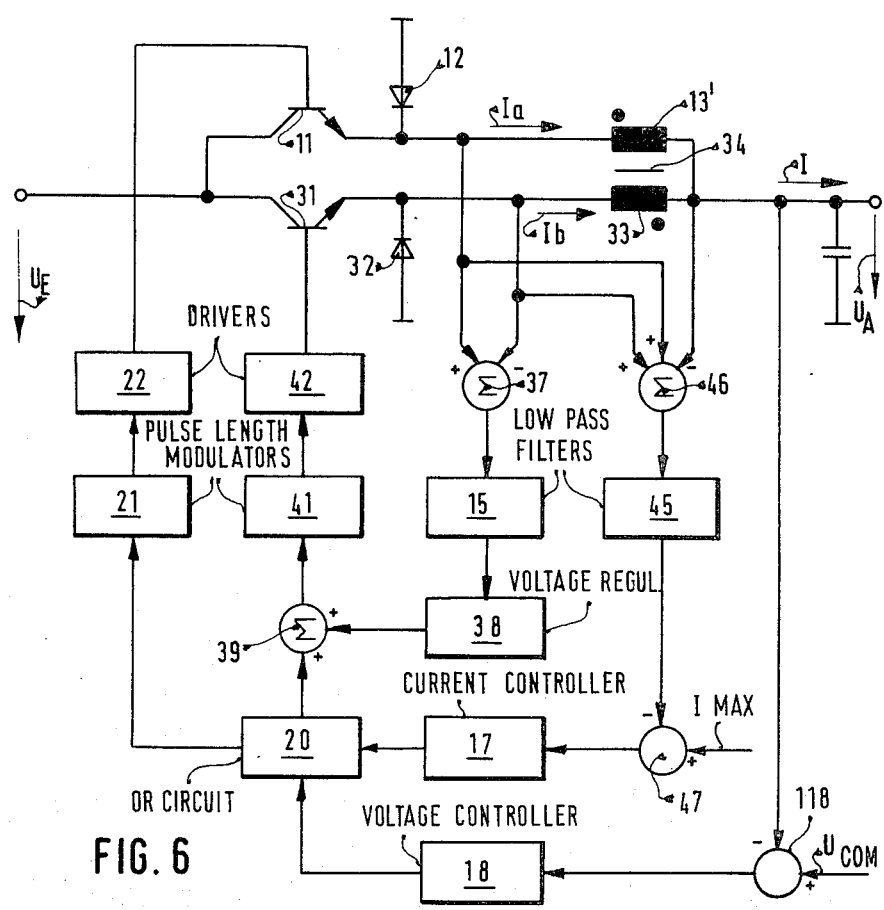
FIG. 6 is a circuit diagram of a modified type of two-pulse current supply.

FIG. 6 illustrates a third embodiment of the invention in which the maximum current control of FIG. 1 and the dual pulse control circuit of FIG. 5 are combined. The voltages arising in the two coils 13' and 33 are utilized, as in the example of FIG. 5, to control the current flow through the two chokes 13' and 33 to be equal, that is, to have the same voltage—time integral area while, additionally, the overall current is controlled with respect to a maximum current $I_{max}$.

The circuit of FIG. 6 has the transistors 11, 31 (FIG. 5) as well as the free-wheeling diodes 12, 32 and the chokes 13', 33 to form two parallel current branches or paths. A summing circuit 46 is provided which sums the input voltages of the two chokes 13', 33 and the output voltage of the choke coils. A low-pass filter 45 eliminates the a-c voltage component, and the remaining d-c component is applied to a summing circuit 47 in which it is compared (by subtraction) with a reference value corresponding to maximum current $I_{max}$, and is then applied to a current controller 17, similar to FIG. 1. The remainder of the circuit is similar to that of FIG. 5, except that the output from the voltage controller 18 is connected to an OR-function circuit 20 (as in FIG. 1) to be then summed in circuit 39 as in FIG. 5.

In the embodiment of FIGS. 5 and 6, the summing circuit 37 forms the difference $$\Delta I_{ab} = I_a - I_b \quad (1)$$

In FIG. 6, the summing circuit 46 forms the sum $$\Sigma I_{ab} = I_a + I_b \quad (2)$$

in which $I_a$ and $I_b$ are the respective branch currents in the branches including the respective chokes 13' and 33.

The current difference $\Delta I_{ab}$ is proportional to the voltage (U)-time (t)-areas of the respective branches in which the chokes are included. Consequently, this signal can be used to control the system for equal voltage-integral areas. This is obtained by utilizing the difference voltage controller 38 which forms a control voltage or signal derived from the value $\Delta I_{ab}$ to, in turn, control the pulse length, or duty cycle, as the case may be, of, for example, one (or both) of the transistors 11, 31 until the difference becomes zero. Controlling one transistor in this manner, as shown in FIGS. 5 and 6, is usually sufficient.

The sum current $\Sigma I_{ab}$ is used to control the output current or, rather, to limit the output current to a maximum value, $I \leq I_{max}$.

Since the voltage-time areas or integrals are controlled to be equal, it is not necessary to select the transistors 11, 31 to be accurately matched to each other, that is, to so select the transistors to have equal current-voltage characteristics. It is also not necessary to match the circuits to each other and to so adjust the two branches that they exhibit the same switching delays.

Various changes and modifications may be made, and features described in connection with any one of the embodiments may be used with any of the others, within the scope of the inventive concept.

In a representative example, the choke 13 had a d-c resistance of 0.02 ohms, and an inductance of 0.2 mkg.

Summing circuit 16 was resistance network.

Low-pass filter 15 was RC-circuit.

Current controller 17 was operational amplifier.

Pulse length modulator 21 was operational ampl. & RC network.

Voltage controller 18 was operational amplifier.

Comparator 118 was resistance network.

In the systems of FIGS. 5 and 6, the adding circuit 37, operating as a differentiator, was RC network. The summing circuit 39 was operational amplifier, and the difference voltage regulator 38 was operational amplifier.

We claim:

1. Controlled d-c current supply system for connection to a d-c source (10) and to supply current to a load having
    a controlled semiconductor switch (11) having a control terminal;
    a choke coil (13) having windings serially connected with the switching path of the semiconductor switch;
    a free-wheeling diode (12) connected between the switching path of the semiconductor switch and the choke coil;
    a capacitor (14) connected to the choke coil at the side thereof remote from the free-wheeling diode;
    means (20, 21, 22) providing conduction controlling pulses to the control terminal of the semiconductor switch to render the semiconductor switch cyclically conductive for controlled periods;

and means to sense current flow to the load to additionally control said pulse providing means comprising, in accordance with the invention, means (16, 16a, 16b, 15) connected across the choke and including a low-pass filter (15) to derive a signal representative of the d-c voltage drop ($U_R$) in the choke (13) due to the inherent resistance ($R_{Cu}$) of the windings thereof;

and a current control stage (17) having said voltage-drop-representative-signal applied thereto and connected to said pulse providing means (20, 21, 22) to control the duty cycle of the pulse providing means as a function of the output of the current control stage.

2. System according to claim 1, in which the current through the choke is regulated not to exceed a predetermined maximum;

including means (117b) providing a signal representative of maximum current, a comparator (117, 47) having said maximum current signal and the output from the voltage-drop-representative-signal furnishing means applied thereto and providing a control signal to said current control stage (17).

3. System according to claim 1 or 2, wherein the voltage-drop-representative-signal deriving means comprises a summing circuit (16) having two inputs (16a, 16b) connected to the respective terminals of the choke to obtain the voltage-time integrals at the respective terminals of the choke and the d-c voltage drop ($U_R$) upon current flow through the choke, said voltage-time integrals cancelling each other leaving said d-c voltge drop ($U_R$);

the output from the summing circuit (16) being connected to the low-pass filter (15, 45) to eliminate a-c components due to the cyclical switching of the semiconductor switch (11).

4. System according to claim 1, wherein the voltage-drop-representative-signal deriving means comprises a summing circuit (16) having two inputs (16a, 16b), said inputs being connected to terminals of the choke and to apply to the summing circuit signals representative of the voltage-time integral at the terminals of the choke;

the output from the summing circuit (16) being connected to the low-pass filter (15, 45) to eliminate a-c components due to the cyclical switching of the semiconductor swtich (11).

5. System according to claim 1, wherein two choke coils (13′, 33) are provided, positioned on a common core (34);

two semiconductor switches (11, 31) are provided, one each being serially connected to a respective choke (13′, 33) to form with the respective choke a current supply branch;

the voltage-drop-representative signal deriving means being connected to both of said choke coils;

a voltage regulator is provided, connected to the low-pass filter of said voltage-drop-representative-signal deriving means;

and means (39; 41, 42) connected to and controlled by the voltage regulator (38) and controlling the duty cycle of at least one (31) of said semiconductor switches (11, 31) to equalize the voltage-time integrals of the signals at the respective choke coils.

6. System according to claim 5, wherein the voltage-drop-representative-signal deriving means includes a summing circuit (37) algebraically subtracting the voltages at the respective chokes (13′, 33) to form a difference voltage signal which is applied to said low-pass filter (15) and hence to said voltage regulator (38), the voltage regulator controlling said switch control means (39, 41, 42) to null differences of the choke voltages.

7. System according to claim 6, wherein the voltage-drop-representative-signal deriving means comprises an additional summing circuit (46), forming the algebraic sum of the voltages across both said chokes (13′, 33), a further low-pass filter (45) is provided having the output of said additional summing circuit (46) applied thereto;

means (117b; $I_{max}$) providing a signal representative of maximum current and;

a comparator (117) having said maximum current signal and the output from the additional low-pass filter applied thereto and providing a control signal to the control stage to regulate said system to supply current having a predetermined relation to said maximum current representative signal.

8. Controlled d-c current supply system for connection to a d-c source (10) and to supply current to a load having two controlled semiconductor switches (11, 31);

two choke coils (13′, 33) positioned on a common core, said choke coils having windings, each serially connected with the switching path of a respective semiconductor switch;

two free-wheeling diodes (12, 32), one each connected between the switching path of a semiconductor switch and the associated serially connected choke coil;

a capacitor (14) connected to the choke coils at the sides thereof remote from the free-wheeling diodes, said capacitor being connected to the load;

means (21, 22; 41, 42) providing conduction controlling pulses to the respective semiconductor switches (11, 31);

and means to sense current flow to the load to additionally control said pulse providing means and to equalize current flow through said choke coils, comprising, in accordance with the invention, means (35, 36, 37; 15) connected to the choke coils at the sides thereof where the free-wheeling diodes (12, 32) are connected and including a low-pass filter for deriving signals representative of the voltage-time integral at the respective terminals of the choke;

a voltage regulator (38) connected to the low-pass filter of said voltage-drop-representative-signal deriving means;

and means (39) connected to and controlling at least one (41, 42) of said conduction controlling pulse providing means (21, 22; 41, 42) connected to and controlled by said voltage regulator to control the duty cycle of at least one (31) of said semiconductor switches (11, 31) to equalize the voltage-time integrals of the signals at the respective choke coils.

9. System according to claim 8, wherein the voltage-drop-representative-signal deriving means includes a summing circuit (37) algebraically subtracting the voltages at the respective chokes (13′, 33) to form a difference voltage signal which is applied to said low-pass filter (15) and hence to said voltage regulator (38), the voltage regulator controlling said switch control means (39, 41, 42) to null differences of the choke voltages.

10. System according to claim 8 or 9, further including an additional summing circuit (46) forming the algebraic sum of voltage drops across both said chokes due to the inherent resistance ($R_{Cu}$) of the windings of the chokes upon current flow through the respective chokes;

a further low-pass filter (45) having the output of said at additional summing circuit (46) applied thereto; and control circuit means (117b; $I_{max}$; 117) connected to and controlled by the output from said further low-pass filter and providing a control output to at least one (41, 42) of said conduction control pulse providing means (21, 22) to provide an additional control signal to supply current to the load having a predetermined controlled relationship in accordance with the command of said control means.

* * * * *